(12) United States Patent
Yamasaki et al.

(10) Patent No.: US 11,388,097 B2
(45) Date of Patent: Jul. 12, 2022

(54) SETTING DEVICE, PARAMETER SETTING METHOD, AND STORAGE MEDIUM STORING PROGRAM

(71) Applicant: TOYOTA JIDOSHA KABUSHIKI KAISHA, Toyota (JP)

(72) Inventors: Yasuhiro Yamasaki, Okazaki (JP); Daisuke Takata, Tajimi (JP); Keigo Kawahara, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/221,968

(22) Filed: Apr. 5, 2021

(65) Prior Publication Data

US 2021/0367893 A1 Nov. 25, 2021

(30) Foreign Application Priority Data

May 19, 2020 (JP) .............................. JP2020-087510

(51) Int. Cl.
*H04L 12/851* (2013.01)
*H04L 47/2425* (2022.01)
*H04L 47/628* (2022.01)
*H04L 47/6295* (2022.01)
*H04L 47/283* (2022.01)

(52) U.S. Cl.
CPC ........ *H04L 47/2433* (2013.01); *H04L 47/283* (2013.01); *H04L 47/628* (2013.01); *H04L 47/6295* (2013.01)

(58) Field of Classification Search
CPC . H04L 47/2433; H04L 47/283; H04L 47/628; H04L 47/6295; H04L 49/351

USPC .......................................................... 370/235
See application file for complete search history.

(56) References Cited

U.S. PATENT DOCUMENTS

| 9,565,118 | B1* | 2/2017 | Pannell | H04L 47/6215 |
| 2013/0176958 | A1* | 7/2013 | Xie | H04W 72/121 |
| | | | | 370/329 |
| 2016/0294910 | A1* | 10/2016 | Li | H04L 65/607 |
| 2016/0295265 | A1* | 10/2016 | Li | H04N 21/64769 |
| 2016/0373380 | A1* | 12/2016 | Nagayama | H04L 43/16 |
| 2019/0104090 | A1* | 4/2019 | Labonte | H04L 49/252 |
| 2020/0177517 | A1* | 6/2020 | Pancras | H04L 47/6215 |
| 2020/0389407 | A1* | 12/2020 | Pasio | H04W 28/0236 |
| 2022/0014970 | A1* | 1/2022 | Cao | H04L 47/2433 |

FOREIGN PATENT DOCUMENTS

JP 2017-108247 A 6/2017

* cited by examiner

*Primary Examiner* — Robert J Lopata
(74) *Attorney, Agent, or Firm* — Oliff PLC (57) ABSTRACT

A setting device to set a parameter for transmission queues at an Ethernet switch, the setting device including a processor. The processor is configured to assign associations between an attribute associated with a transmission frame and a plurality of the queues having different priorities, set a parameter for a high priority queue having a priority equal to or higher than a threshold based on an adverse condition transmission schedule having transmission timings less desirable than those of a preset transmission schedule, and set a parameter for a low priority queue having a priority of less than the threshold using processing that is different from processing for setting the parameter for the high priority queue.

9 Claims, 8 Drawing Sheets

SETTING DEVICE, PARAMETER SETTING METHOD, AND STORAGE MEDIUM STORING PROGRAM

CROSS-REFERENCE TO RELATED APPLICATION

This application is based on and claims priority under 35 USC 119 from Japanese Patent Application No. 2020-087510 filed on May 19, 2020, the disclosure of which is incorporated by reference herein.

BACKGROUND

Technical Field

The present disclosure relates to a setting device, a parameter setting method, and a storage medium storing a program used to set parameters for transmission queues at an Ethernet switch.

Related Art

Japanese Patent Application Laid-Open (JP-A) No. 2017-108247 discloses a communication system used to transmit messages from an ECU to another ECU via an Ethernet switch.

In Ethernet (registered trademark) communication, an Ethernet switch transmits messages in plural queues according to a prescribed scheduling method. For example, in the case of a weighted round robin (WRR) method, queues assigned a priority are weighted in order to extract and transmit several messages from each queue.

However, if queue parameters of weights and buffer sizes are not set appropriately, there is a possibility of delay and loss even of high priority messages assigned to high priority queues.

SUMMARY

An object of the present disclosure is to provide a setting device, a parameter setting method, and a program to set parameters that meet prescribed quality targets while suppressing delay and loss of high priority messages assigned to a high priority queue when setting transmission queue parameters for an Ethernet switch.

A first aspect is a setting device to set a parameter for transmission queues at an Ethernet switch, the setting device including an assignment section, a first setting section, and a second setting section. The assignment section is configured to assign associations between an attribute associated with a transmission frame and plural of the queues having different priorities. The first setting section is configured to set a parameter for a high priority queue having a priority equal to or higher than a threshold based on an adverse condition transmission schedule having transmission timings less desirable than those of a preset transmission schedule. The second setting section is configured to set a parameter for a low priority queue having a priority of less than the threshold using processing that is different from processing of the first setting section.

In the setting device of the first aspect, the assignment section is configured to assign associations between the attribute associated with a transmission frame and the plural queues having different priorities. In the setting device, the first setting section is configured to set a parameter for a high priority queue and the second setting section is configured to set a parameter for a low priority queue using processing different to the processing in the first setting section. When setting the parameter of transmission queues at an Ethernet switch, the setting device sets the parameter so as to suppress delay or loss for high priority messages assigned to a high priority queue, and so as to meet a prescribed quality target.

A setting device of a second aspect is the setting device of the first aspect, wherein the parameter includes a band corresponding to the queue and a necessary buffer size for packet transmission, and the first setting section sets the band and the necessary buffer size so that communication delay is resolvable even in a case in which packet transmission is according to the adverse condition transmission schedule.

In the setting device of the second aspect, the band and the buffer size are set so that communication delay is resolvable even in cases in which packet transmission is according to the adverse condition transmission schedule having transmission timings less desirable than those of the preset transmission schedule. The setting device enables optimization of transmission timings for high priority messages by setting plural parameters.

A setting device of a third aspect is the setting device of the second aspect, wherein the band includes a weight according to a weighted round robin method.

The setting device of the third aspect is applicable to communication in a weighted round robin method. The setting device enables optimization of the transmission timings for high priority messages according to the transmission frames in a transmission schedule.

A setting device of a fourth aspect is the setting device of the second or third aspect, wherein the first setting section adds an additional amount of packets to the buffer size for jitter.

The setting device of the fourth aspect enables loss of high priority messages to be suppressed even in cases in which jitter has occurred when packets are bunched.

A setting device of a fifth aspect is the setting device of any one of the second to the fourth aspects, wherein the first setting section adds an additional amount of packets to the buffer size for occurrence of an event communication not conforming to the transmission schedule.

The setting device of the fifth aspect enables loss of high priority messages to be suppressed even in cases in which an event communication has occurred when packets are bunched.

A setting device of a sixth aspect is the setting device of any one of the second to the fifth aspects, wherein the second setting section arranges a parameter of the low priority queue so as to minimize communication delay and communication loss based on a buffer size obtained by subtracting a buffer size of the high priority queues from a total buffer size of the Ethernet switch.

The setting device of the sixth aspect enables optimization of transmission timings for low priority messages as well as for high priority messages.

A setting device of a seventh aspect is the setting device of any one of the first to the sixth aspects, wherein the Ethernet switch is an Ethernet switch for interconnecting plural control devices installed at a vehicle, and the assignment section assigns associations to the queues based on a risk level of communication in the vehicle as the attribute.

The setting device of the seventh aspect is an Ethernet switch for interconnecting plural control devices installed at a vehicle. The setting device is capable of suppressing loss of communication important to travel of the vehicle by assigning associations to queues based the risk level of the communication in the vehicle.

An eighth aspect is a parameter setting method to set a parameter for transmission queues at an Ethernet switch. The parameter setting method includes assignment processing, first setting processing, and second setting processing. The assignment processing assigns associations between an attribute associated with a transmission frame and plural of the queues having different priorities. The first setting processing sets a parameter for a high priority queue having a priority equal to or higher than a threshold based on an adverse condition transmission schedule having transmission timings less desirable than those of a preset transmission schedule. The second setting processing sets a parameter for a low priority queue having a priority of less than the threshold using processing that is different from the first setting processing.

The parameter setting method of the eight aspect uses the assignment processing to assign associations between the attribute associated with a transmission frame and the plural queues having different priorities. The setting method uses the first setting processing to set the parameter for a high priority queue and uses the second setting processing to set the parameter for a low priority queue using different processing to the first setting processing. This setting method enables parameters for transmission queues at an Ethernet switch to be set so as to suppress delay or loss of high priority messages assigned to high priority queues while also setting parameters that meet a prescribed quality target.

A ninth aspect is a non-transitory storage medium storing a program to set a parameter for transmission queues at an Ethernet switch. The program causes a computer to execute processing including assignment processing to assign associations between an attribute associated with a transmission frame and plural of the queues having different priorities, first setting processing to set a parameter for a high priority queue having a priority equal to or higher than a threshold based on an adverse condition transmission schedule having transmission timings less desirable than those of a preset transmission schedule, and second setting processing to set a parameter for a low priority queue having a priority of less than the threshold using processing that is different from the first setting processing.

The program recorded on the non-transitory storage medium of the ninth aspect causes a computer to execute the following processing. Namely, in the computer, the assignment processing is used to assign associations between the attribute associated with a transmission frame and plural of the queues having different priorities. In the computer, the first setting processing is used to set a parameter for a high priority queue and the second setting processing is used to set a parameter for a low priority queue using different processing to the first setting processing. This program enables parameters for transmission queues at an Ethernet switch to be set so as to suppress delay or loss of high priority messages assigned to high priority queues while also setting parameters that meet a prescribed quality target.

The present disclosure enables parameters for transmission queues at an Ethernet switch to be set so as to suppress delay or loss of high priority messages assigned to high priority queues while also setting parameters that meet a prescribed quality target.

BRIEF DESCRIPTION OF THE DRAWINGS

An exemplary embodiment of the present disclosure will be described in detail based on the following figures, wherein.

DETAILED DESCRIPTION

Vehicle Configuration

First, explanation follows regarding a vehicle 10 installed with an Ethernet switch 14 with parameters set by a parameter setting device 20 of a present exemplary embodiment.

Figure 1:
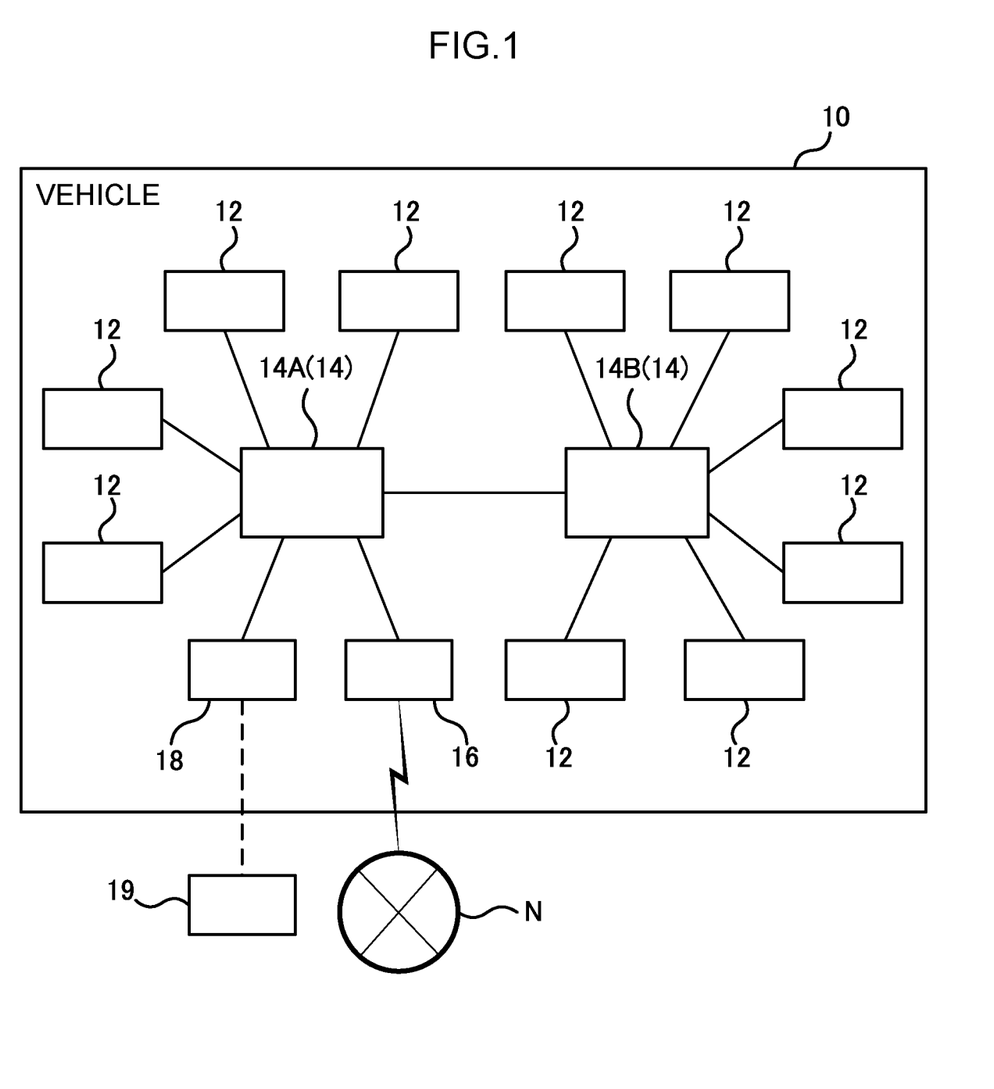
FIG. 1 is a diagram illustrating a schematic configuration of a vehicle according to an exemplary embodiment.

As illustrated in FIG. 1, the vehicle 10 of the present exemplary embodiment is configured including ten electronic control units (ECUs) 12, these being control devices, and two Ethernet switches 14. Note that the number of the ECUs 12 is not limited to being ten, and the number of the Ethernet switches 14 is not limited to being two.

The Ethernet switches 14 include a first Ethernet switch 14A and a second Ethernet switch 14B. Four of the ECUs 12 are connected to the first Ethernet switch 14A, and six of the ECUs 12 are connected to the second Ethernet switch 14B. The first Ethernet switch 14A and the second Ethernet switch 14B are also connected directly together. Each of the Ethernet switches 14 has a maximum of eight ports.

Communication between the respective ECUs 12 is controlled using a designated timing chart, described later, and parameters, described later, set for the respective Ethernet switches 14. The designated timing chart and the parameters are set by the parameter setting device 20.

A data communication module (DCM) 16, this being a communication device, is connected to the first Ethernet switch 14A. The DCM 16 is connected to a network N. Note that the network N employs wireless communication using, for example, a communication protocol such as 5G, LTE, or Wi-Fi (registered trademark).

A data link connector (DLC) 18 is connected to the first Ethernet switch 14A. The DLC 18 is capable of connecting to a vehicle diagnostic tool 19, this being a diagnostic tool.

Ethernet Switch

Figure 2:
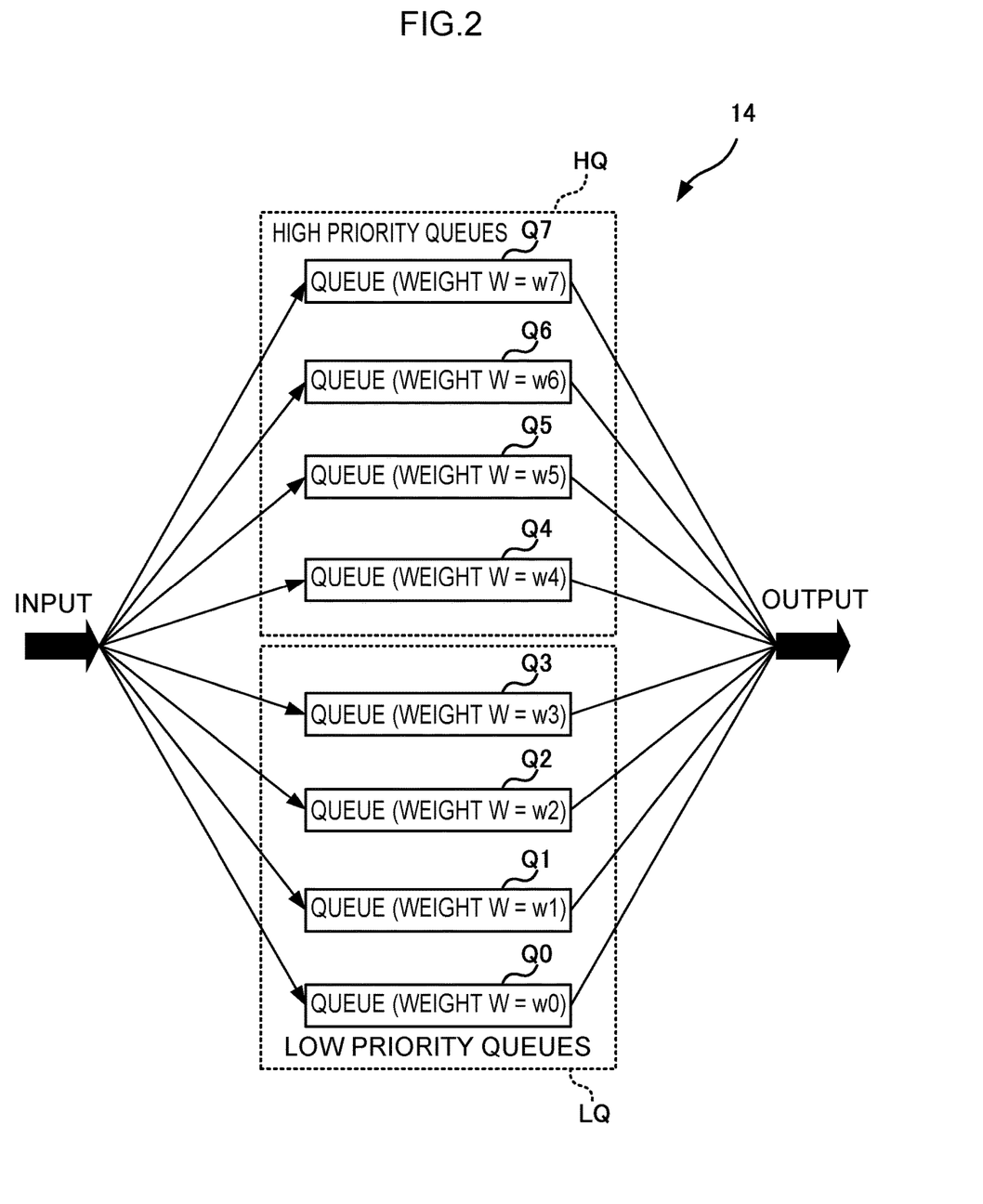
FIG. 2 is a diagram illustrating an Ethernet switch of an exemplary embodiment in order to explain output port queues.

As illustrated in FIG. 2, the Ethernet switches 14 of the present exemplary embodiment each have eight queues for the respective output side ports. Specifically, each of the output ports has queues of from queue Q0 to queue Q7. Note that in the present exemplary embodiment, setting is made such that the priority increases from 0 to 7 on progression from queue Q0 to queue Q7, with the queues Q0 to queue Q3 that have a priority of less than four being classified as being low priority queues LQ, and the queues Q4 to queue Q7 that have a priority of four or higher being classified as being high priority queues HQ. Note that the classification of the low priority queues LQ and the high priority queues HQ is set by parameter setting processing, described later.

In the present exemplary embodiment, data transmission is performed by a weighted round robin (WRR) method, with respective weights W of w0 to w7 being set for queue Q0 to queue Q7. Packets input to the respective output ports are held in one of the queues of queue Q0 to queue Q7, and are output in sequence taking into account the priority and the weights W.

Each of the queues is set with a necessary buffer size BS for transmitting messages. The buffer sizes BS include a theoretical maximum buffer size B1, a first additional buffer size B2, this being a packet size corresponding to an additional amount for jitter, and a second additional buffer size B3, this being a packet size with an additional amount for event communication (see FIG. 9). The weights W and the buffer sizes BS of the present exemplary embodiment are variable setting parameters assigned to the transmission queues.

Parameter Setting Device

Next, explanation follows regarding the parameter setting device 20 that sets the parameters of the Ethernet switches 14.

Figure 3:
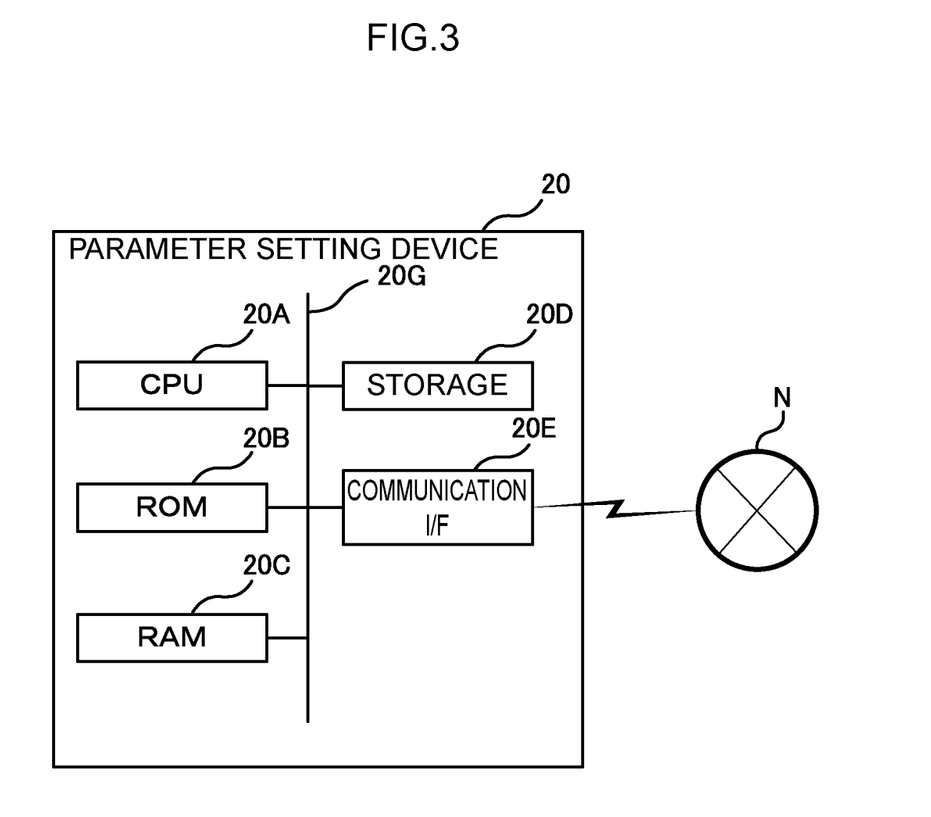
FIG. 3 is a block diagram illustrating a hardware configuration of a parameter setting device of an exemplary embodiment.

As illustrated in FIG. 3, the parameter setting device 20 serves as a setting device and is configured including a central processing unit (CPU) 20A, read only memory (ROM) 20B, random access memory (RAM) 20C, storage 20D, and a communication interface (I/F) 20E. The CPU 20A, the ROM 20B, the RAM 20C, the storage 20D, and the communication I/F 20E are connected together through a bus 20G so as to be capable of communicating with each other.

The CPU 20A is a central processing unit that executes various programs and controls various sections. Namely, the CPU 20A reads a program from the ROM 20B or the storage 20D, and executes the program using the RAM 20C as a workspace. The CPU 20A is an example of a processor.

The ROM 20B stores various programs and various data. The ROM 20B of the present exemplary embodiment stores various programs used to control the parameter setting device 20.

The RAM 20C serves as a workspace that temporarily stores programs and data.

Figure 4:
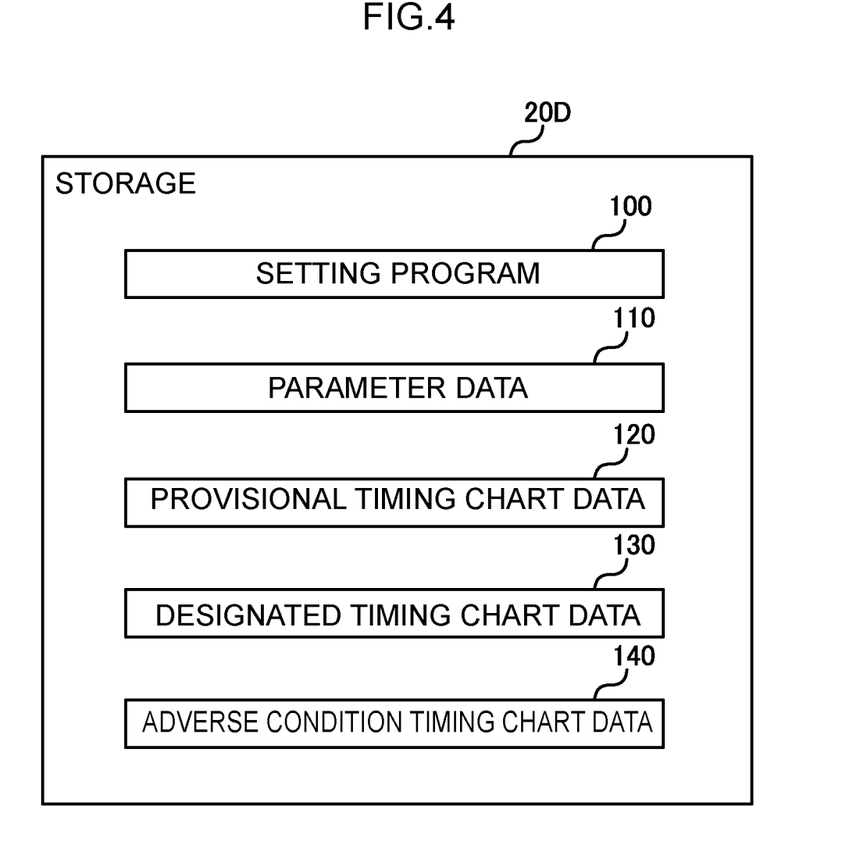
FIG. 4 is a block diagram illustrating a storage configuration of a parameter setting device of an exemplary embodiment.

The storage 20D serves as a storage section and is configured by a hard disk drive (HDD) or a solid state drive (SSD), and stores various programs and various data. As illustrated in FIG. 4, the storage 20D of the present exemplary embodiment stores a setting program 100, parameter data 110, provisional timing chart data 120, designated timing chart data 130, and adverse condition timing chart data 140.

The setting program 100 is a program used to set parameters of the Ethernet switches 14. The setting program 100 is used to execute parameter setting processing, described later.

The parameter data 110 is stored with parameters for the eight queues of the respective output ports of the Ethernet switches 14 as set by the parameter setting device 20.

The provisional timing chart data 120 is stored with data corresponding to a provisional timing chart to be input into a simulator during processing relating to high priority queue HQ settings, described later. The provisional timing chart data 120 is generated based on a transmission interval of periodic communication, conditions for event communication occurrence, and the like, as received by a reception section 210, described later.

The designated timing chart data 130 is stored with data corresponding to a designated timing chart created as a result of processing related to setting a high priority queue HQ.

The adverse condition timing chart data 140 is stored data corresponding to an adverse condition timing chart created based on the designated timing chart.

As illustrated in FIG. 3, the communication I/F 20E is a communication device used to connect with external devices. The communication I/F 20E is connected to the network N.

Figure 5:
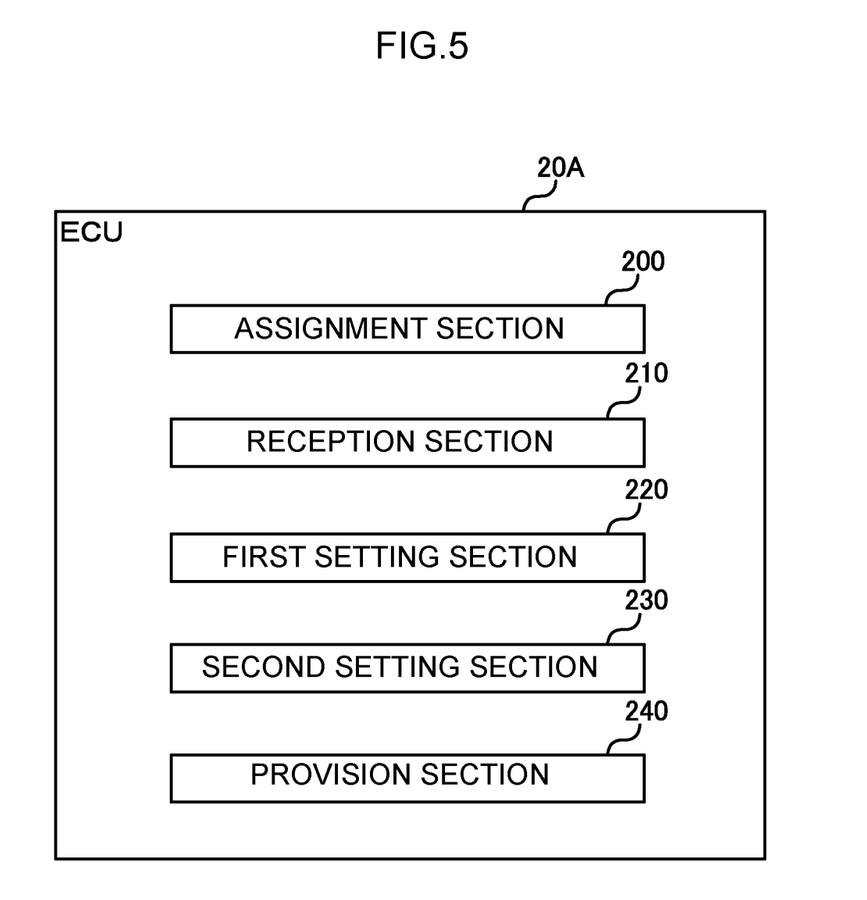
FIG. 5 is a block diagram illustrating functional configuration of a CPU in a parameter setting device of an exemplary embodiment.

As illustrated in FIG. 5, in the parameter setting device 20 of the present exemplary embodiment the CPU 20A executes the setting program 100 so as to function as an assignment section 200, the reception section 210, a first setting section 220, a second setting section 230, and a provision section 240.

The assignment section 200 includes functionality to execute assignment processing to assign associations between attributes associated with transmission frames and plural queues having different priority to each other. The assignment processing by the assignment section 200 partitions the queue Q0 to queue Q7 into the classification of high priority queues HQ and the low priority queues LQ. In the present exemplary embodiment, a risk level of communication in the vehicle 10 is assigned as a communication attribute. The risk levels are defined based on automotive safety integrity levels (ASIL) in addition to independent quality standards.

Note that the risk level of communication is stored in the header of the corresponding transmission frame as a priority of the transmission frame. Specifically, the priority of the transmission frame is stored as a three-bit priority code point (PCP) in a virtual local area network (VLAN) header, or as a three-bit IP precedence in a type of service (ToS) field of an interne protocol (IP) header.

For example, the assignment section 200 assigns transmission frames having a high priority to a high priority queue HQ, these being transmission frames of communication corresponding to ASIL level B or higher that are employed in control of a brake system, electric power steering, airbag system, or the like. Moreover, for example, the assignment section 200 assigns transmission frames with a low priority to a low priority queue LQ, these being transmission frames of communication corresponding to ASIL level A or quality management (QM) communications that are employed in lighting control or the like.

The reception section 210 includes functionality to receive an inter-ECU 12 transmission schedule that is the basis of the designated timing chart. For example, for communication from a given ECU 12 to another of the ECUs 12, the reception section 210 receives the transmission interval of periodic communication set by the vehicle 10 designer, conditions for event communication occurrence, and the like. Event communications refer to communications that occur in response to a request from an application or the like at unpredictable occurrence timings.

The first setting section 220 includes functionality to execute first setting processing to set parameters for the high priority queues HQ. The first setting section 220 sets parameters for the high priority queues HQ based on the adverse condition timing chart of transmissions whose timing is less desirable than those of the preset designated timing chart. Specifically, the first setting section 220 sets a band such that communication delay is resolvable even for cases in which packets are transmitted according to the adverse condition timing chart, and sets the buffer size BS therefor. The "band" of the present exemplary embodiment is a weight W of weighted round robin. Note that the designated timing chart is an example of a preset transmission schedule, and the adverse condition timing chart is an example of an adverse condition transmission schedule.

The first setting section 220 adds the first additional buffer size B2 of packet size corresponding to an additional amount for jitter to the buffer size BS. Moreover, the first setting section 220 adds the second additional buffer size B3 to the buffer size BS in cases in which an event communication not conforming to the designated timing chart has occurred.

The second setting section 230 includes functionality to perform second setting processing to set parameters for the low priority queues LQ. Specifically, based on a buffer size obtained by subtracting the buffer size BS for the high priority queues HQ set by the first setting section 220 from the total buffer size of the Ethernet switches 14, the second setting section 230 sets parameters for the low priority queues LQ so as to minimize communication delay and communication loss.

The provision section 240 includes functionality to provide the high priority queue HQ parameters set by the first setting section 220 and the low priority queues LQ parameters set by the second setting section 230 to the Ethernet switches 14 over the network N. Note that the method for providing these parameters is not limited to a method employing the network N, and alternative methods of provision include a method in which the parameters are pre-installed in the Ethernet switches 14 or a method in which the parameters are provided via the vehicle diagnostic tool 19.

Control Flow

Figure 6:
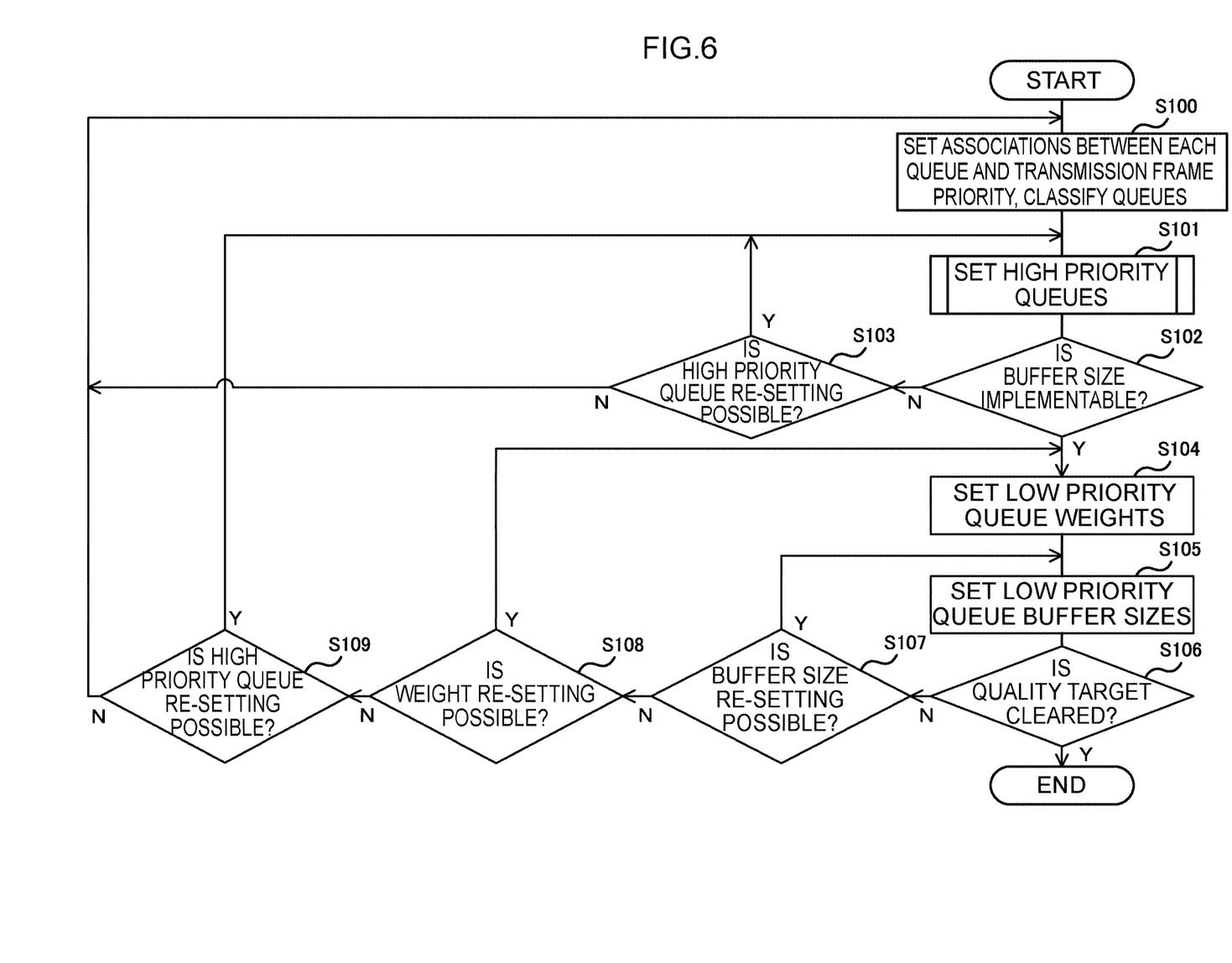
FIG. 6 is a flowchart illustrating a flow of parameter setting processing in a parameter setting device of an exemplary embodiment.
Figure 7:
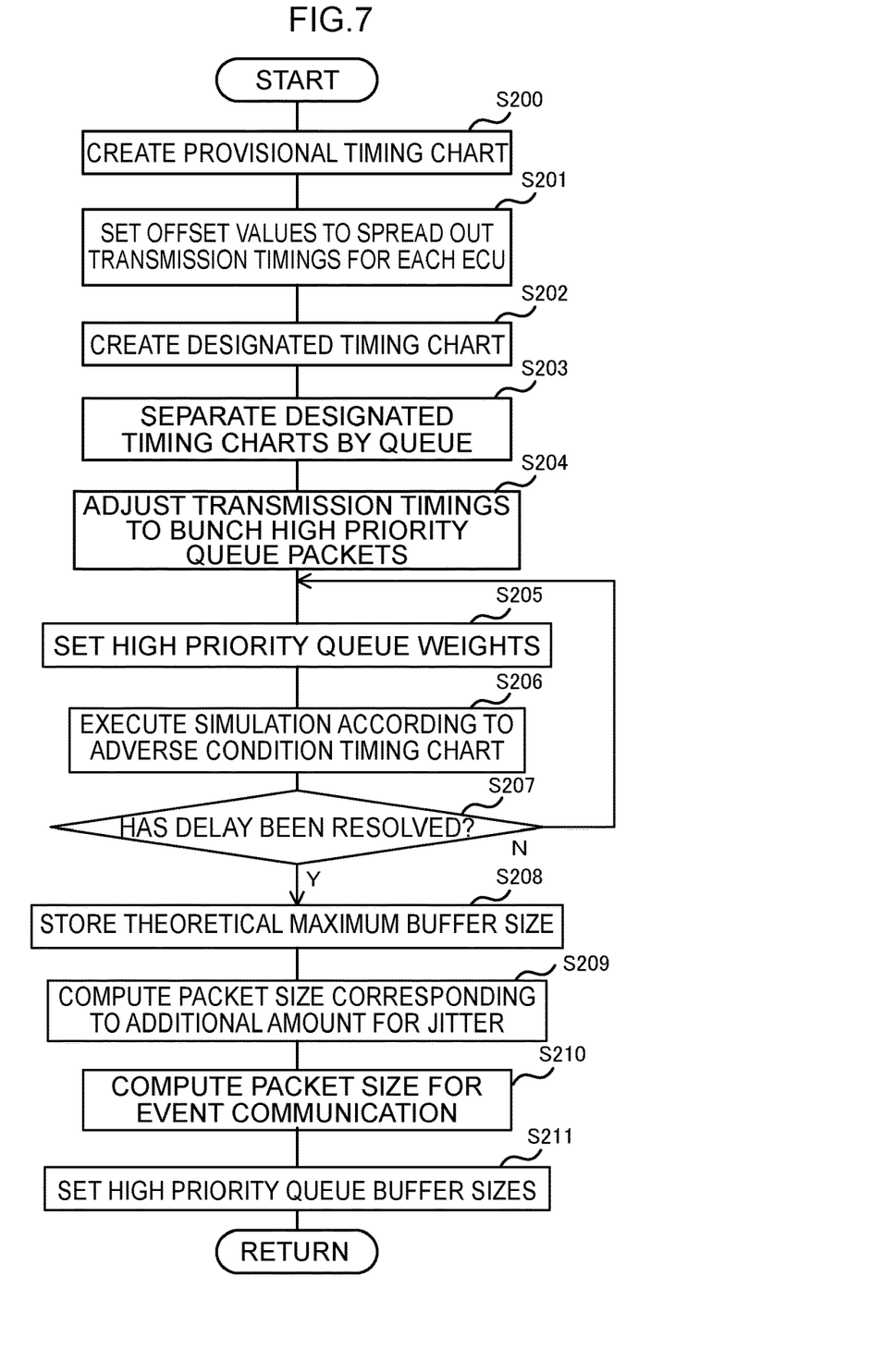
FIG. 7 is a flowchart illustrating a flow of processing relating to setting a high priority queue in a parameter setting device of an exemplary embodiment.

Explanation follows regarding a flow of processing executed by the parameter setting device 20 of the present exemplary embodiment, with reference to the flowcharts of FIG. 6 and FIG. 7. First, explanation follows regarding the parameter setting processing illustrated in FIG. 6.

At step S100 in FIG. 6, the CPU 20A sets associations between the respective queues and the transmission frame priority. The CPU 20A also partitions the respective queues into classifications of the high priority queues HQ and the low priority queues LQ.

In the present exemplary embodiment, the transmission frame priority is defined using the three-bit PCP in a VLAN header. Transmission frames with a PCP value of 0 are associated with the queue Q0, transmission frames with a PCP value of 1 are associated with the queue Q1 transmission frames with a PCP value of 2 are associated with the queue Q2, transmission frames with a PCP value of 3 are associated with the queue Q3, transmission frames with a PCP value of 4 are associated with the queue Q4, transmission frames with a PCP value of 5 are associated with the queue Q5, transmission frames with a PCP value of 6 are associated with the queue Q6, and transmission frames with a PCP value of 7 are associated with the queue Q7. Note that the transmission frame and queue associations are not limited thereto, and for example in cases in which only two queues, namely the queue Q0 and the queue Q1 are present, transmission frames with PCP values of 0 to 3 may be associated with the queue Q0, and transmission frames with PCP values of 4 to 7 may be associated with the queue Q1.

Although in the present exemplary embodiment the queue Q4 to the queue Q7 are set as high priority queues HQ, and the queue Q0 to the queue Q3 are set as low priority queues LQ as illustrated in FIG. 2, there is no limitation thereto. For example, the queue Q5 to the queue Q7 may be set as high priority queues HQ, and the queue Q0 to the queue Q4 may be set as low priority queues LQ. Alternatively, the queue Q3 to the queue Q7 may be set as high priority queues HQ, and the queue Q0 to the queue Q2 may be set as low priority queues LQ.

At step S101, the CPU 20A performs setting for the high priority queues HQ. This will be described in detail later. The weights W and buffer sizes BS of each of the high priority queues HQ are set by step S101.

At step S102, the CPU 20A determines whether or not the buffer sizes BS of the high priority queues HQ are of implementable size. Processing proceeds to step S104 in cases in which the CPU 20A determines that the buffer sizes BS of the high priority queues HQ are an implementable size. On the other hand, processing proceeds to step S103 in cases in which the CPU 20A determines that the buffer sizes BS of the high priority queues HQ are not an implementable size.

At step S103, the CPU 20A determines whether or not it is possible to re-set the high priority queues HQ. Processing returns to step S101 in cases in which the CPU 20A determines that re-setting of the high priority queues HQ is possible. On the other hand, processing returns to step S100 in cases in which the CPU 20A determines that re-setting of the high priority queues HQ is not possible.

At step S104, the CPU 20A sets the weights W of the low priority queues LQ. Note that in cases in which only one high priority queue HQ and one low priority queue LQ are present, the weight W for the low priority queue LQ is set at a point when the high priority queue HQ parameters have been set.

At step S105, the CPU 20A sets the buffer sizes BS of the low priority queues LQ. Specifically, the CPU 20A first runs a simulation with no constraints to the buffer size BS, and stores maximum buffer sizes, these being the maximum values of the buffer sizes BS utilized by each port during the simulation.

Next, in cases in which the sum of the maximum buffer sizes for each port for the low priority queues LQ from the simulation is smaller than a remaining buffer size, the CPU 20A sets each of the low priority queues LQ with a buffer size BS that is the size of the respective maximum buffer size or greater. Note that the remaining buffer size refers to the total buffer size of the Ethernet switches 14 remaining after subtracting the buffer sizes BS at each port for all of the high priority queues HQ.

On the other hand, in cases in which the sum of the maximum buffer sizes for each port for the low priority queues LQ from the simulation is greater than the remaining buffer size, the CPU 20A sets the buffer sizes BS by apportioning the remaining buffer according to ratios between the maximum buffer sizes of the respective low priority queues LQ.

At step S106, the CPU 20A determines whether or not a quality target has been cleared. The parameter setting processing is ended in cases in which the CPU 20A determines that the quality target has been cleared. On the other hand, processing proceeds to step S107 in cases in which the CPU 20A determines that the quality target has not been cleared.

Communication quality is set for the each of the respective high priority queues HQ and low priority queues LQ, and includes benchmarks for throughput, delay, loss, and jitter. The designer sets a target value for each benchmark in advance. For example, in cases in which a target value for loss is set to no greater than 1%, loss is checked by simulation and at step S106 determination is made as to whether or not loss has reached 1%. Determination is made that the quality target has been cleared if loss is no greater than 1%, and determination is made that the quality target has not been attained if loss is greater than 1%. Determination as to whether or not quality targets have been cleared is also made in a similar manner for throughput, delay, and jitter.

At step S107, the CPU 20A determines whether or not re-setting of the buffer size BS is possible. Processing returns to step S105 in cases in which the CPU 20A determines that re-setting of the buffer size BS is possible. On the other hand, processing proceeds to step S108 in cases in which the CPU 20A determines that re-setting of the buffer size BS is not possible.

At step S108, the CPU 20A determines whether or not re-setting of the weights W is possible. Processing returns to step S104 in cases in which the CPU 20A determines that re-setting of the weights W is possible. On the other hand, processing proceeds to step S109 in cases in which the CPU 20A determines that re-setting of the weights W is not possible.

At step S109, the CPU 20A determines whether or not re-setting for the high priority queues HQ is possible. Processing returns to step S101 in cases in which the CPU 20A determines that re-setting for the high priority queues HQ is possible. On the other hand, processing returns to step S100 in cases in which the CPU 20A determines that re-setting for the high priority queues HQ is not possible.

Next, detailed explanation follows regarding setting for the high priority queues HQ, with reference to FIG. 7.

At step S200 in FIG. 7, the CPU 20A creates a provisional timing chart based on a transmission schedule input by the designer. The provisional timing chart does not take into consideration collisions between packets from the respective ECUs 12, and arbitrary timings are set. Peaks may therefore arise in the transmission timings were packets to be transmitted based on the provisional timing chart.

At step S201, the CPU 20A sets an offset value to spread out the transmission timings of messages with transmission originating from one given ECU 12 from out of the respective ECUs 12. Specifically, in the provisional timing chart for each of the ECUs 12, the CPU 20A searches around a candidate time and places the message such that the message is offset so as to be at a location where there is a minimum number of colliding packets. This search is executed for each 1 ms interval over a range of from 1 ms to 10 ms.

At step S202, the CPU 20A creates a designated timing chart reflecting the offset values with respect to the provisional timing chart.

At step S203, the CPU 20A breaks down the individual queues in the designated timing chart. Namely, a chart for packet transmission is created for each of the ECUs 12 in each queue.

At step S204, the CPU 20A adjusts transmission timings in the high priority queues HQ so as to bunch packets together. More specifically, the CPU 20A adjusts transmission timings by providing difference between start times of the respective ECUs 12 so as to bunch packets together in the designated timing chart for each queue. An adverse condition timing chart is thus created to reflect the worst possible scenario for packet peaks in each queue.

At step S205, the CPU 20A sets the weights W of the high priority queues HQ. Any desired values may be set at this point.

At step S206, the CPU 20A runs a simulation using the adverse condition timing chart.

At step S207, the CPU 20A determines whether or not packet delay has been resolved. Processing proceeds to step S208 in cases in which the CPU 20A determines that the packet delay has been resolved. On the other hand, processing returns to step S205 in cases in which the CPU 20A determines that the packet delay has not been resolved.

At step S208, the CPU 20A stores the theoretical maximum buffer size B1.

Figure 8:
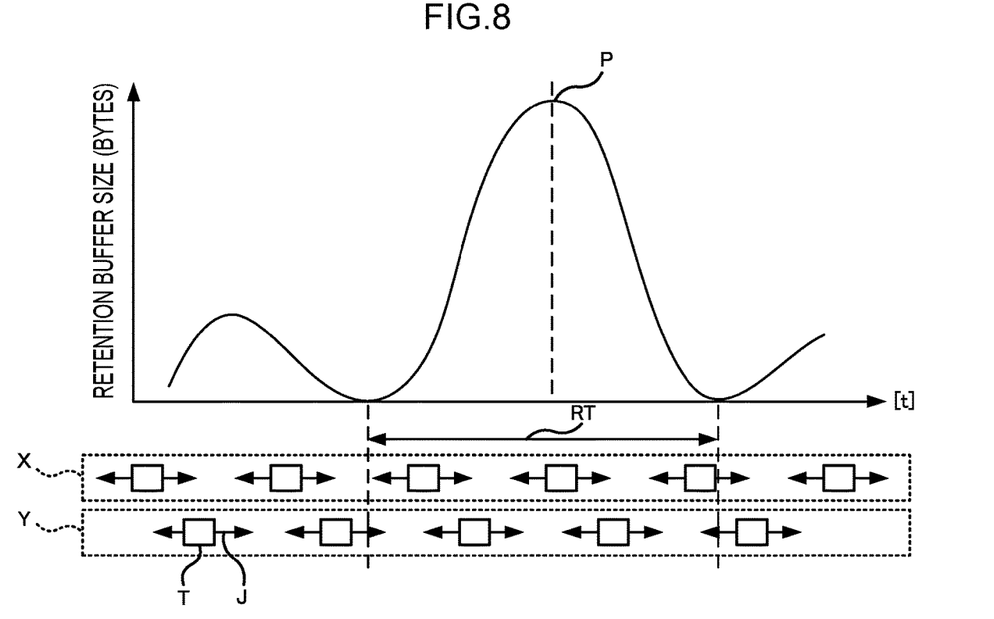
FIG. 8 is a diagram to explain a method of computing a packet size corresponding to an additional amount for jitter in a parameter setting device of an exemplary embodiment.

At step S209, the CPU 20A computes the first additional buffer size B2 having a packet size corresponding to an additional amount for jitter. As illustrated in FIG. 8, the CPU 20A computes a retention buffer size based on the simulation using the adverse condition timing chart, and finds a retention time RT including a peak P. The CPU 20A then computes a packet size for packets falling within the retention time RT in cases in which packets that would not occur within the retention time RT containing the peak P occur at a time shifted earlier or later by a jitter width J so as to actually fall within the retention time RT. In the example illustrated in FIG. 8, the second packet and the fifth packet in message Y do not fall within the retention time RT when occurring at the regular timing T, but do fall within the retention time RT when their transmission timings have been shifted within a jitter width J range. Accordingly, a size of two packets worth of message Y is employed as the first additional buffer size B2 added to the packet size for the message X and the message Y at the regular timing T in the retention time RT.

At step S210 in FIG. 7, the CPU 20A computes the second additional buffer size B3 having a packet size for an event communication. Specifically, in cases in which the event communication packet size does not exceed the maximum size of a frame definition, this being 1500 bytes, the CPU 20A sets the event communication packet size as the second additional buffer size B3.

On the other hand, in cases in which the event communication packet size exceeds 1500 bytes, the CPU 20A computes a packet size from the retention time RT of the message (see FIG. 8) and the packet transmission interval. In cases in which the retention time RT is shorter than the transmission interval, the CPU 20A sets 1500 bytes, i.e. the maximum size of a single packet, as the second additional buffer size B3. On the other hand, in cases in which the retention time RT is longer than the transmission interval, the CPU 20A considers how many times packet sending is possible in the retention time RT, and sets the second additional buffer size B3 as this number multiplied by the maximum size of a single packet.

For example, in cases in which the retention time RT is 10 ms and a message is transmitted every 2 ms, the second additional buffer size B3 is set to 1500 bytes×6, for the messages at 0 ms, 2 ms, 4 ms, 6 ms, 8 ms, 10 ms.

Figure 9:
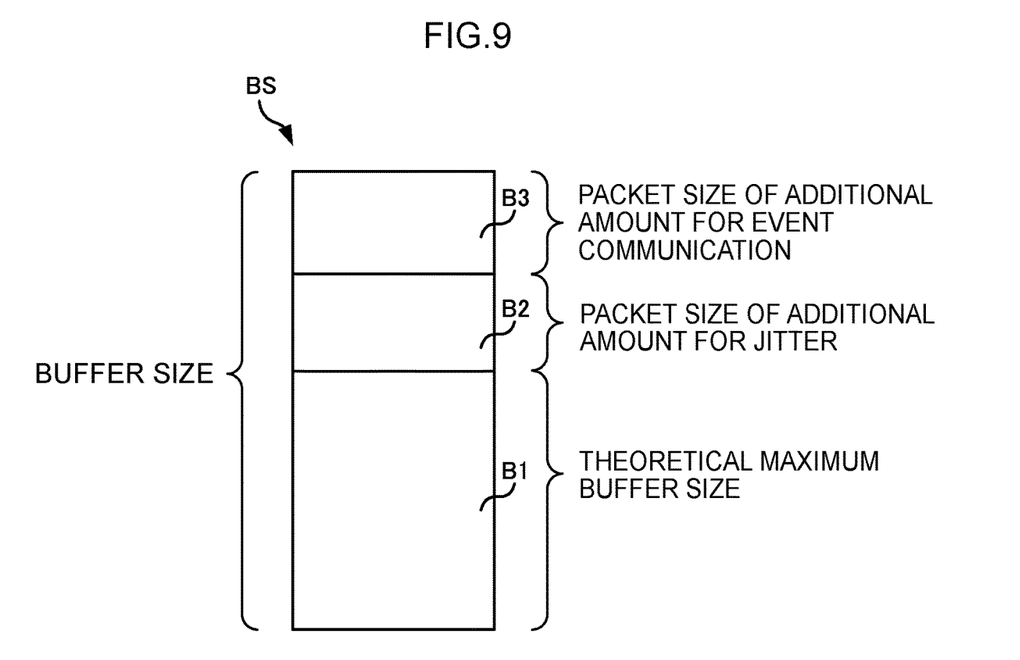
FIG. 9 is a diagram to explain configuration of buffer sizes set by a parameter setting device of an exemplary embodiment.

At step S211, the CPU 20A sets the buffer size BS of the high priority queues HQ by adding the first additional buffer size B2 and the second additional buffer size B3 to the theoretical maximum buffer size B1 (see FIG. 9). The CPU 20A then returns to step S102 of FIG. 6.

Summary of the Exemplary Embodiment

In the parameter setting device 20 of the present exemplary embodiment, the assignment section 200 assigns associations between the attribute associated with transmission frames and plural queues having different priority. The first setting section 220 of the parameter setting device 20 sets parameters for the high priority queues HQ, and the second setting section 230 of the parameter setting device 20 sets parameters for the low priority queues LQ using different processing to the processing of the first setting section 220. The present exemplary embodiment enables parameters for transmission queues at the Ethernet switches 14 to be set so as to suppress delay or loss of high priority messages assigned to high priority queues while also setting parameters that meet a prescribed quality target.

According to the present exemplary embodiment, weights W and buffer sizes BS are set so as to correspond to a band of resolvable communication delay even in cases in which packets are transmitted according to the adverse condition timing chart having transmission timings less desirable than in the designated timing chart. The present exemplary embodiment enables optimization of transmission timings for high priority messages by setting plural parameters.

In particular, the parameter setting device 20 of the present exemplary embodiment employs weighted round robin communication. This enables optimization of the transmission timings for high priority messages according to the transmission frames in a designated timing chart by setting the weights W for bands corresponding to queues.

Note that the "bands" set as parameters are not limited to the weights W in a weighted round robin method, and parameters of another scheduling method, such as credit values in a method defined for IEEE802.1Qav, or time slots in a method defined for IEEE802.1Qbv, may be employed.

In the present exemplary embodiment, a packet size corresponding to an additional amount for jitter is computed, thus enabling loss of high priority messages to be suppressed even in cases in which jitter occurs when packets are bunched together. Moreover, in the present exemplary embodiment, the packet size of event communication is computed, enabling loss of high priority messages to be suppressed even in cases in which an event communication occurs when packets are bunched together.

The exemplary embodiment described above enables setting of the buffer sizes BS for the high priority queues HQ to be performed using separate methods for periodic communication according to the designated timing chart, for communication in which jitter arises in the periodic communication, and for event communication not by the periodic communication.

Moreover, the present exemplary embodiment enables optimization of transmission timings for low priority messages as well as for high priority messages.

The present exemplary embodiment enables design to be performed so as to ensure a quality for high priority queues HQ in cases in which communication conditions are adverse, and design to be performed so as to ensure an average quality for low priority queues LQ. Although ensuring the quality in cases in which communication conditions are adverse is resource-intensive in terms of memory and the like, the present exemplary embodiment is not designed to ensure the quality of all messages in cases in which communication conditions are adverse, and the design method varies according to message attributes. The present exemplary embodiment is capable of ensuring communication loss free communication even when high priority queue HQ messages for which quality communication is demanded by the vehicle 10 are at their poorest. Moreover, a design that does not consume unnecessary resources can be implemented by setting average settings for low priority queue LQ messages that are not demanding in terms of communication quality.

The parameter setting device 20 of the present exemplary embodiment is accordingly well-suited to application to parameter setting to cases in which there are plural interconnected ECUs 12 installed at the vehicle 10. The present exemplary embodiment is capable of suppressing loss of communication important to travel of the vehicle 10 by assigning associations to queues based the risk level of the communication in the vehicle 10.

Remarks

The various processing executed by the CPU 20A reading software (a program) in the exemplary embodiments described above may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing described above may be executed by any one of these various types of processor, or may be executed by a combination of two or more of the same type or different types of processor (such as plural FPGAs, or a combination of a CPU and an FPGA). The hardware structure of such various types of processors is more specifically an electric circuit combining circuit elements such as semiconductor elements.

In the exemplary embodiment described above, explanation has been given in which programs are stored in advance (installed) on a computer-readable non-transitory storage medium. For example, the setting program 100 of the parameter setting device 20 is stored in advance in the storage 20D. However, there is no limitation thereto and the programs may be provided in a format recorded on a non-transitory storage medium such as a compact disc read only memory (CD-ROM), digital versatile disc read only memory (DVD-ROM), or universal serial bus (USB) memory. Alternatively, the program may be provided in a format to be downloaded from an external device over a network.

The flow of processing in the exemplary embodiment described above is merely an example thereof, and unnecessary steps may be removed, new steps may be added, or the processing sequence may be changed within a range not departing from the spirit thereof.

What is claimed is:

1. A setting device to set a parameter for transmission queues at an Ethernet switch, the setting device comprising a processor configured to:
   assign associations between an attribute associated with a transmission frame and a plurality of the queues having different priorities;
   set a first parameter for a high priority queue of the plurality of queues having a priority equal to or higher than a threshold based on an adverse condition transmission schedule having transmission timings less desirable than transmission timings of a preset transmission schedule, the first parameter including a band corresponding to the high priority queue and a necessary buffer size for packet transmission;
   set a second parameter for a low priority queue having a priority of less than the threshold using processing that is different from processing for setting the first parameter for the high priority queue; and set the band and the necessary buffer size to a band and a buffer size for which communication delay is resolvable when the packet transmission is performed according to the adverse condition transmission schedule.

2. The setting device of claim 1, wherein the band includes a weight according to a weighted round robin method.

3. The setting device of claim 1, wherein the processor is configured to add an additional amount of packets to the buffer size for jitter.

4. The setting device of claim 1, wherein the processor is configured to add an additional amount of packets to the buffer size for occurrence of an event communication not conforming to the preset transmission schedule.

5. The setting device of claim 1, wherein the processor is configured to arrange the second parameter of the low priority queue so as to minimize communication delay and communication loss based on a buffer size obtained by subtracting the buffer size of the high priority queues from a total buffer size of the Ethernet switch.

6. The setting device of claim 1, wherein:
the Ethernet switch is an Ethernet switch for interconnecting a plurality of control devices installed at a vehicle; and
the processor is configured to assign the associations to the plurality of queues based on a risk level of communication in the vehicle as the attribute.

7. A parameter setting method to set a parameter for transmission queues at an Ethernet switch, the parameter setting method comprising:
performing assignment processing to assign associations between an attribute associated with a transmission frame and a plurality of the queues having different priorities;
performing a first setting processing to set a first parameter for a high priority queue of the plurality of queues having a priority equal to or higher than a threshold based on an adverse condition transmission schedule having transmission timings less desirable than transmission timings of a preset transmission schedule, the first parameter including a band corresponding to the high priority queue and a necessary buffer size for packet transmission;
performing a second setting processing to set a second parameter for a low priority queue having a priority of less than the threshold using processing that is different from the first setting processing; and
setting the band and the necessary buffer size to a band and a buffer size for which communication delay is resolvable when the packet transmission is performed according to the adverse condition transmission schedule.

8. The parameter setting method of claim 7, wherein:
after executing the first setting processing, the second setting processing is repeatedly executed until a quality that includes communication delay and communication loss attains a prescribed target; and
when the target is unattainable by executing the second setting processing, processing returns for re-execution of the first setting processing.

9. A non-transitory computer readable storage medium storing a program executable by a computer to perform processing to set a parameter for transmission queues at an Ethernet switch, the processing comprising:
assignment processing to assign associations between an attribute associated with a transmission frame and a plurality of the queues having different priorities;
first setting processing to set a first parameter for a high priority queue of the plurality of queues having a priority equal to or higher than a threshold based on an adverse condition transmission schedule having transmission timings less desirable than transmission timings of a preset transmission schedule, the first parameter including a band corresponding to the high priority queue and a necessary buffer size for packet transmission;
second setting processing to set a second parameter for a low priority queue having a priority of less than the threshold using processing that is different from the first setting processing; and
third setting processing to set the band and the necessary buffer size to a band and a buffer size for which communication delay is resolvable when the packet transmission is performed according to the adverse condition transmission schedule.

\* \* \* \* \*